United States Patent [19]

Beach et al.

[11] Patent Number: 5,364,461
[45] Date of Patent: Nov. 15, 1994

[54] INKS USED IN MULTI-COLOR PRINTING

[75] Inventors: Bradley L. Beach; Kathryn E. Burns; Terence E. Franey; Ann M. Piekunka, all of Lexington; Paul T. Spivey, Winchester; Agnes K. Zimmer, Lexington, all of Ky.

[73] Assignee: Lexmark International, Inc., Greenwich, Conn.

[21] Appl. No.: 142,037

[22] Filed: Oct. 28, 1993

[51] Int. Cl.$^5$ ............................................. C09D 11/02
[52] U.S. Cl. ................................. 106/22 R; 106/20 D
[58] Field of Search ............................. 106/22 R, 20 D

[56] References Cited

U.S. PATENT DOCUMENTS

| | | | |
|---|---|---|---|
| 4,381,946 | 5/1983 | Uehara et al. | 106/22 K |
| 4,732,613 | 3/1988 | Shioya et al. | 106/20 |
| 5,116,409 | 5/1992 | Moffatt | 106/22 |
| 5,141,558 | 8/1992 | Shirota et al. | 106/22 |
| 5,165,968 | 11/1992 | Johnson et al. | 427/288 |
| 5,196,056 | 3/1993 | Prasad | 105/15.05 |
| 5,196,057 | 3/1993 | Escano et al. | 106/22 R |
| 5,207,824 | 5/1993 | Moffatt et al. | 106/22 R |

*Primary Examiner*—Helene Klemanski
*Attorney, Agent, or Firm*—John A. Brady

[57] ABSTRACT

Aqueous inks containing 1,2-alkyl of from C4 to C10 diols, specifically 1,2-hexanediol or 1,2-pentanediol are employed in jet inks. Two such inks of different colors applied side-by-side to paper do not bleed and therefore give excellent image definition. The diols are not flammable, odorous or highly volatile.

9 Claims, No Drawings

INKS USED IN MULTI-COLOR PRINTING

TECHNICAL FIELD

This invention relates to printing with liquid ink on paper with more than one color positioned contiguously. Typically, the ink is applied as drops from an ink jet printer. To achieve good color quality, the inks may not bleed laterally on the paper into each other.

BACKGROUND OF THE INVENTION

This invention employs 1,2-alkyl diols of from C4 to C10 (4 to 10 carbon atoms forming the alkyl) in otherwise conventional aqueous inks to eliminate bleeding of inks of different colors. The use of alcohols in such inks is conventional, as illustrated in U.S. Pat. Nos. 5,207,824 to Moffatt et al, 5,196,056 to Prasad and 5,196,057 to Escano et al, but not the use of 1,2-alkyl diols of from C4 to C10. U.S. Patent No. 5, 165,968 to Johnson et al lists 1,2-pentane diol as unacceptable for the inks of that patent.

U.S. Pat. No. 5,141,558 to Shirota et al teaches the use of a wide variation of triols in such inks to improve anti-feathering, drying, and penetrability. U.S. Pat. No. 4,732,613 to Shioya et al teaches multi-color printing from inks generally as contemplated by this invention and lists a number of di and tri propyl or higher alcohols. 1,2,6-hexanetriol is listed, but the 1,2 diol of butane or higher alkane is not listed.

U.S. Pat. No. 5,116,409 to Moffatt teaches a bleed alleviation mechanism employing a surfactant to form micelles. At least with respect to the C4 to C6 diols of this invention, this invention does not employ micelle formation, as shown by the absence of a sharp break in the surface tension versus concentration plots of inks of this invention.

The mechanism employed by this invention is increased penetration. Primary alcohols such as n-propanol, n-butanol and n-pentanol increase penetration and thus eliminate bleed, but for reasons such as flammability with the lower alcohols, odor, and higher volatility in the ink, these primary alcohols should be avoided or may be undesirable. The 1,2 diols of C4 and C10 have the same effect on penetration and thus bleed but are not flammable and may be used in inks without special precautions.

DISCLOSURE OF THE INVENTION

This invention employs aqueous inks of at least two colors applied to paper close together in time in close lateral proximity. The inks contain at least in the order of magnitude of 0.1 to 12.5 percent by weight 1,2-alkyl diols of from C4 to C10, preferably about 2.5 percent 1,2-hexanediol. In general, the shorter carbon chains require a higher percentage of diol to eliminate bleed. The colors do not bleed, and an excellent multicolor image definition is obtained.

The use of 1,2,6-hexanetriol, or any diol except 1,2 diol is entirely ineffective to achieve the same reduction of bleed obtained from the 1,2 diols. The use of the triols of the foregoing U.S. Pat. No. 5,141,558 is believed to be at least much less effective to achieve reduction of bleed as obtained from the 1,2 diols.

The 1,2-alkyl diols have the added feature of increasing the penetration of the ink and thus eliminating the bleed at relatively low concentrations, specifically less than 6% by weight. The more common diols with alcohol substituents on the end carbons are ineffective at bleed control at concentration under 10% by weight, this includes such compounds as 1,4-butanediol, 1,5-pentanediol, and 1,6-hexanediol. 1,2,6-hexanetriol, as discussed in some detail below, was ineffective at 20% by weight.

BEST MODE FOR CARRYING OUT THE INVENTION

The liquid ink formulas in accordance with the preferred embodiment of this invention are as follows:

INKS

| Material | Percent by Weight |
| --- | --- |
| Dye | 2.5 |
| EDTA (ethylenediaminetetraacetic acid, tetrasodium salt) (chelating agent) | 0.1 |
| 1,2-Hexanediol | 5.0 |
| Triethylene glycol (humectant) | 5.0 |
| Proxel GXL (trademark, biocide) | 0.2 |
| Sodium phosphate (buffer) | 0.75 |
| Water | Balance |

This ink has the following characteristics: Surface tension: 36 dynes per cm; pH: 7.5–8.8, depending on the dye; and viscosity: 1.3 cSt at 25 degrees C. (higher viscosity inks also function well in accordance with this invention).

Preferred dyes are the following:

Magenta:

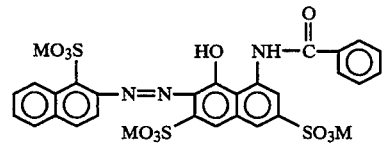

wherein M is H, Li, Na, K, —NH$_4$.

BLUE

Direct Blue 199

Direct Blue 199 is a sulfonated copper phthalocyanine dye, a commercial product of Zeneca Colours Inc. and other firms.

YELLOW

Direct Yellow 132

Direct Yellow 132 is a sulfonated azo dye, a commercial product of Zeneca Colours Inc. and other firms.

The subject invention, however, is applicable to inks having virtually any water-soluble dye.

In a typical application, four inks are used, one having a magenta dye, one having a cyan dye, one having yellow dye and one having a black dye. The magenta, cyan and yellow dyes are subtractive and are applied on top of one another to produce colors which may include the entire visible spectrum. The black is used for outlines and symbols. Application of the inks is by any standard ink jet printing. The preferred inks are formulated for thermal ink jet printing in which heating of the ink vaporizes water and that vapor serves as a propellant. The preferred inks are a solution with no particulate components. The paper tested is ordinary neutral cellulosic paper, and similar function with ordinary., acid or basic paper is projected. The inks are printed contiguously and virtually simultaneously and no bleeding across the boundary of two inks is experienced.

A close substitute for the 1,2-hexanediol is 1,2-pentanediol. Although, more of the 1,2-pentanediol would be required to eliminate bleed. Pentanediol and other substitutes and the level of use are in the following table:

TABLE

| 1,2-Alkyldiol | Minimum level at or around By Weight |
|---|---|
| 1,2-butanediol | 12.5% |
| 1,2-pentanediol | 7.5% |
| 1,2-hexanediol | 2.5% |
| 1,2-octanediol | 1.0% |
| 1,2-decanediol | 0.1% |

The above levels of 1,2-alkyl diol are merely guidelines for bleed alleviation. Lower levels can be achieved by combination of one or more diols. The exact level necessary for bleed depends on the printhead design, the printer driver, and the media and environmental conditions for which one is optimizing. For example, lower drop mass in the printhead improves bleed. Effects such shingling (repetitive overprinting) and ink depletion (skipping dots in printing) in the printer driver also improves the output color bleed quality. In these cases, a lower level of diol is possible.

The 1,2 diols are not common. Where the higher alkane diols are mentioned in chemical literature without qualification, that does not imply 1,2 diols. In fact, 1,2 diols are actually available in the United States in limited quantities.

Inks have been formulated and tested in a manner exactly corresponding to the foregoing preferred embodiment except that 1,2,6-hexanetriol was substituted for the 1,2-hexanediol. Tests were made at 5 percent by weight of the 1,2,6-hexanetriol and at higher weights up to 20 percent by weight of the 1,2,6-hexanetriol. No significant alleviation of bleeding was observed while, of course, the same ink having 1,2-hexanediol virtually eliminated bleeding at 5 percent by weight.

Variations in the ink formula can be extensive so long as the 1,2 diols are employed.

What is claimed is:

1. An ink for inkjet printing comprising a polar vehicle, a dye soluble in said vehicle and a 1,2-alkyl diol of from 4 to 10 carbon atoms forming the alkyl; said diol being in an amount of at least in the order of magnitude of 0.1% by weight when said carbon atoms are 10 and 12.5% by weight when said carbon atoms are 4 and intermediate said amounts when said carbon atoms are from 5 to 9.

2. The ink as in claim 1 in which said diol is 1,2-hexanediol.

3. The ink as in claim 1 in which said diol is 1,2-pentanediol.

4. The ink as in claim 3 in which said 1,2-pentanediol is in amount of at least about 7.5 percent by weight.

5. The ink as in claim 1 in which said alkyl 1,2 diol is in amount of at least about 1 percent by weight when said carbon atoms are 8.

6. The ink as in claim 2 in which said 1,2-hexanediol is in amount of at least about 2.5 percent by weight.

7. A process of multi-color printing comprising printing on paper from a first ink of one color and a second ink of a different color on a first region with said first ink and on a second region in close lateral proximity to said first region in close proximity in time to said printing on said first region with said second ink, each of said inks being an aqueous ink containing at least one dye to provide said color and a 1,2-alkyl diol of from 4 to 10 carbon atoms forming the alkyl in amount to prevent lateral bleeding of said inks.

8. The process as in claim 1 in which said diol is 1,2-hexanediol.

9. The process as in claim 1 in which said diol is 1,2-pentanediol.

* * * * *

UNITED STATES PATENT AND TRADEMARK OFFICE
CERTIFICATE OF CORRECTION

PATENT NO. : 5,364,461
DATED : Nov. 15, 1994
INVENTOR(S) : B.L. Beach et al.

It is certified that error appears in the above-identified patent and that said Letters Patent is hereby corrected as shown below:

```
claim 8, col. 4, Line 35 - change "1" to read - 7 -.
claim 9, col. 4, Line 37 - change "1" to read - 7 -.
```

Signed and Sealed this

Third Day of June, 1997

Attest:

BRUCE LEHMAN

Attesting Officer

Commissioner of Patents and Trademarks